(12) United States Patent
Uccellani et al.

(10) Patent No.: US 11,898,696 B2
(45) Date of Patent: Feb. 13, 2024

(54) GREASE GUN

(71) Applicant: Macnaught Pty Ltd, Turrella (AU)

(72) Inventors: Marco Uccellani, Turrella (AU); Prabhjot Singh, Turrella (AU)

(73) Assignee: Macnaught Pty Ltd, Turrella (AU)

(*) Notice: Subject to any disclaimer, the term of this patent is extended or adjusted under 35 U.S.C. 154(b) by 16 days.

(21) Appl. No.: 17/792,862

(22) PCT Filed: Dec. 15, 2020

(86) PCT No.: PCT/AU2020/051372
§ 371 (c)(1),
(2) Date: Jul. 14, 2022

(87) PCT Pub. No.: WO2021/142508
PCT Pub. Date: Jul. 22, 2021

(65) Prior Publication Data
US 2023/0065866 A1    Mar. 2, 2023

Related U.S. Application Data

(60) Provisional application No. 62/962,697, filed on Jan. 17, 2020.

(51) Int. Cl.
*F16N 3/12* (2006.01)
(52) U.S. Cl.
CPC ..................... *F16N 3/12* (2013.01)
(58) Field of Classification Search
CPC ..... F16N 3/08; F16N 3/12; F16N 5/02; F16N 13/02; F16N 13/08; B05C 17/00569
USPC ........................................................ 222/409
See application file for complete search history.

(56) References Cited

U.S. PATENT DOCUMENTS

| 1,668,002 | A | * | 5/1928 | Brown | ............... | F16N 3/12 |
| | | | | | | 222/262 |
| 1,761,127 | A | * | 6/1930 | Jacques | ............... | F16N 3/12 |
| | | | | | | 222/256 |
| 2,982,443 | A | * | 5/1961 | Ellis | ............... | F16N 3/08 |
| | | | | | | 222/401 |

(Continued)

FOREIGN PATENT DOCUMENTS

| CN | 203215224 U | 9/2013 |
| CN | 110617392 A | 12/2019 |
| TW | M391608 U | 11/2010 |

OTHER PUBLICATIONS

International Search Report dated Jan. 25, 2021 in Application No. PCT/AU2020/051372; 6 pages.

(Continued)

*Primary Examiner* — Minh Truong
(74) *Attorney, Agent, or Firm* — Troutman Pepper Hamilton Sanders LLP

(57) ABSTRACT

A grease gun comprising a body having first and second chambers, first and second pistons within those first and second chambers, primary and secondary grease channels, a grease outlet and an actuator, is provided. Actuation of the actuator by a user causes first and second pistons to move within first and second chambers. The body may further comprise a pressure sensitive spool which allows the grease gun to move from a high flow/low pressure operation to a high pressure/low flow operation when there is a grease blockage that causes an increase in the pressure in the body.

19 Claims, 11 Drawing Sheets

(56) References Cited

U.S. PATENT DOCUMENTS

| | | | |
|---|---|---|---|
| 4,664,298 | A | 5/1987 | Shew |
| 5,277,339 | A | 1/1994 | Shew et al. |
| 5,404,967 | A | 4/1995 | Barry |
| 7,377,406 | B2 | 5/2008 | Linkletter et al. |
| 7,527,176 | B2 | 5/2009 | Weems et al. |
| 8,297,476 | B2 | 10/2012 | Weems et al. |
| 8,517,223 | B2 | 8/2013 | Hulden |
| 9,243,748 | B2 | 1/2016 | Kuo |
| 2005/0230430 | A1* | 10/2005 | Linkletter ................. F16N 3/12 222/383.1 |
| 2006/0108180 | A1 | 5/2006 | Grach et al. |
| 2008/0047980 | A1* | 2/2008 | Huang ...................... F16N 3/12 222/263 |
| 2009/0272762 | A1 | 11/2009 | Hulden |
| 2012/0241479 | A1 | 9/2012 | Kuo |
| 2018/0340652 | A1 | 11/2018 | Kawai et al. |
| 2020/0191329 | A1* | 6/2020 | Lusso ................. F16K 15/1823 |
| 2021/0016315 | A1* | 1/2021 | Yoshida ............ B05C 17/00569 |

OTHER PUBLICATIONS

International Search Report dated May 12, 2021 in Application No. PCT/AU2021/050236; 4 pages.
Lock-N-Load Threadless Barrell Grease Guns; Legacy Manufacturing Co.; 2018 Brochure.
International Search Report issued in International Patent Application No. PCT/AU2020/051372 dated Jan. 25, 2021.

* cited by examiner

GREASE GUN

CROSS REFERENCE TO RELATED APPLICATIONS

The present application is a U.S. National Phase Application under 35 U.S.C. § 371 of International Patent Application No. PCT/AU2020/051372 filed Dec. 15, 2020, which claims priority of U.S. Provisional Patent Application No. 62/962,697 filed Jan. 17, 2020. The entire contents of which are hereby incorporated by reference.

TECHNICAL FIELD

The disclosure relates to a grease gun, and in particular a manual grease gun.

BACKGROUND ART

Grease guns are used in a range of industries to lubricate vehicles and other machinery. These grease guns generally include a grease supply (either from an attached barrel or an external source) and a piston, which forces grease under pressure out of an outlet, for application to the relevant machinery for lubrication. Grease guns can be separated into two main types; manual grease guns and power-assisted grease guns (which includes battery-operated, pneumatic and electric grease guns).

When greasing a vehicle or machinery blocked greasing points often occur which results in high greasing pressure. Common causes of high greasing pressure include blocked Zerc fittings, long, tortuous and/or tight greasing channels and thick grease which does not flow easily. Previous systems have been developed that are able to provide additional pressure to the grease in order to clear the blockage. Some systems use an external power source to provide this additional pressure. However, this can be expensive and unwieldly.

Manual grease guns have been developed that are able to move between a high volume/low pressure mode and a low volume/high pressure mode, where the higher pressure provided in the low volume/high pressure mode can clear the blockage. These systems generally require a user to manually switch between the two modes.

More recently, a small number of systems have been developed that are able to switch the grease gun into a low volume/high pressure mode when there is an increase in pressure due to a blockage. However, these systems still have limitations. For example, although these systems might provide for a shift of the grease gun into low volume/high pressure mode, they can be quite difficult to use and require a large amount of pressure from a user to operate in this mode.

In this specification where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

SUMMARY

Disclosed herein is a grease gun comprising a body able to be connected to a container configured to store grease, the body defining first and second elongate chambers therein, the first chamber extending along a first axis and the second chamber extending along a second axis, the first axis being spaced from the second axis, and the second chamber having a smaller cross-sectional area than the first chamber; first and second pistons, the first piston configured to reciprocate within the first chamber along the first axis and the second piston configured to reciprocate within the second chamber along the second axis, the second piston having a smaller cross-sectional area than the first piston; primary and secondary grease channels, the primary grease channel being disposed between the container and the first chamber such that the container is able to be fluidically connected to the first chamber, the secondary grease channel being disposed between the first and secondary chambers, and intermediate a length of the second chamber, such that grease is able to flow from the first chamber into the second chamber; an actuator connected to the body and moveable between a retracted position, whereby grease is able to flow through the primary grease channel, and an extended position, whereby grease is restricted from flowing through the primary grease channel, the actuator being configured to cause reciprocation of the first piston and the second piston when moved between the extended and retracted positions; and a grease outlet fluidically connected to the second chamber that allows for grease to be discharged from the grease gun.

In some forms, the secondary grease channel is disposed intermediate the length of the first and second chambers.

In some forms, the secondary grease channel extends along a secondary grease axis that extends substantially perpendicular to the first and second axes. Preferably, the first axis is parallel to the second axis.

In some forms, the grease gun further comprises a first non-return valve disposed in the secondary channel. The first non-return valve allows grease to flow from the first chamber into the second chamber. Preferably, the first non-return valve restricts grease from flowing from the second chamber into the first chamber. More preferably, the first non-return valve prevents grease from flowing from the second chamber into the first chamber.

In some forms, the grease gun further comprises an outlet cavity between the second chamber and the grease outlet which comprises a second non-return valve which allows grease to flow from the second chamber into the grease outlet. Preferably, the second non-return valve restricts grease from flowing from the outlet cavity into the second chamber. More preferably, the second non-return valve prevents grease from flowing from the grease cavity into the second chamber.

In some forms, the first chamber further comprises a tertiary grease channel. Preferably, there is a third non-return valve within the tertiary grease channel that permits the flow of grease into the first chamber. More preferably, the third non-return valve restricts grease from flowing from the first cavity into the container. Most preferably, the third non-return valve prevents grease from flowing from the first chamber into the container.

In some forms, the actuator has an intermediate position between the retracted position and the engaged position wherein, when the actuator is in the intermediate position, grease is restricted from flowing through the primary grease channel into the first chamber but is not restrict from flowing through the tertiary grease channel into the first chamber. Preferably, the actuator is configured to cause reciprocation of the first and second pistons in the same phase when moved between the engaged, intermediate and retracted positions.

In some forms, the grease gun further comprises the container, which is connected to the body.

In some forms, the grease gun further comprises a mount that is configured to pivotally connect the actuator to the body; and first and second biasing means that are disposed around the first and second pistons respectively and are each configured to bias the actuator towards the retracted position. Preferably, the actuator comprises first and second lugs that are configured to engage the first and second pistons respectively, wherein movement of the actuator from the retracted position towards the engaged position causes the first and second lugs to engage the first and second pistons respectively to cause the first and second pistons to move along the first and second axes respectively.

Also disclosed herein is a grease gun further comprising a first spool channel extending along a third axis, a spool moveable within the first spool channel between an open position and a closed position; and a bypass channel in fluid communication with the first chamber and the container by way of the first spool channel; wherein when the spool is in the open position, it permits the flow of grease out of the first chamber to the grease barrel, and when the spool is in the closed position, it restricts the flow of grease out of the first chamber to the grease barrel.

In some forms, in use, when the spool is in the open position, it permits the flow of grease out of the first chamber into the container and when the spool is in the closed position, it restricts the flow of grease out of the first chamber into the container. Preferably, when the spool is in the closed position, it prevents the flow of grease out of the first chamber into the container.

Also disclosed herein is a grease gun further comprising a pressure channel disposed at a first end of the spool channel, the pressure channel being in fluid communication with the outlet chamber; and a third biasing means disposed at a second end of the spool channel, the third biasing means being configured to bias the spool towards the closed position, wherein an increase in pressure in the outlet chamber causes an increase in pressure in the pressure channel and a resulting increase in pressure in at a first end of the first channel to thereby force the spool against the third biasing means. Preferably, at a predetermined level of pressure at the first end of the first channel the spool is configured to move towards the open position.

In some forms, the bypass channel comprises a primary bypass channel disposed between the first chamber and the spool channel, and a secondary bypass channel disposed between the spool channel and the container. Preferably, the primary bypass channel extends along a primary bypass channel axis and the secondary bypass channel extends along a secondary bypass channel axis, the primary bypass channel axis being offset from the secondary bypass channel axis with regard to the spool channel. More preferably, the primary bypass channel axis is substantially perpendicular to, and spaced from, the secondary bypass channel axis.

In some forms, the spool channel is connected to and disposed between the primary and secondary bypass channels such that when the spool is in the open position grease is able to flow from the primary bypass channel into the secondary bypass channel via the spool channel.

In some forms, the spool comprises a first annular ring and a second annular ring that is spaced from the first annular ring; and a mid-section that is disposed between and boundaried by the first and second annular rings; the mid-section of the spool having a smaller diameter than a diameter of the spool channel and a diameter of the first and second annular rings; wherein an area disposed between the mid-section of the spool and a wall of the spool channel forms a communication channel, the communication channel being in fluid communication with the primary bypass channel regardless of whether the spool is in the open position or the closed position.

In some forms, the spool comprises a cavity that extends through the spool, the cavity being disposed in the mid-section of the spool to allow grease to flow through the mid-section of the spool and fill the communication channel.

In some forms, when the spool is in the closed position, the communication channel is not located adjacent to the secondary bypass channel, thereby restricting the flow of grease from the spool channel into the secondary bypass channel and when the spool is in the open position, the communication channel is located adjacent to the secondary bypass channel, thereby permitting the flow of grease into the secondary bypass channel.

BRIEF DESCRIPTION OF DRAWINGS

Various embodiments/aspects of the disclosure will now be described with reference to the following drawings in which.

DETAILED DESCRIPTION

The present disclosure will now be described with reference to a first embodiment of the grease gun, as shown in FIGS. 1 to 11.

Figure 1:
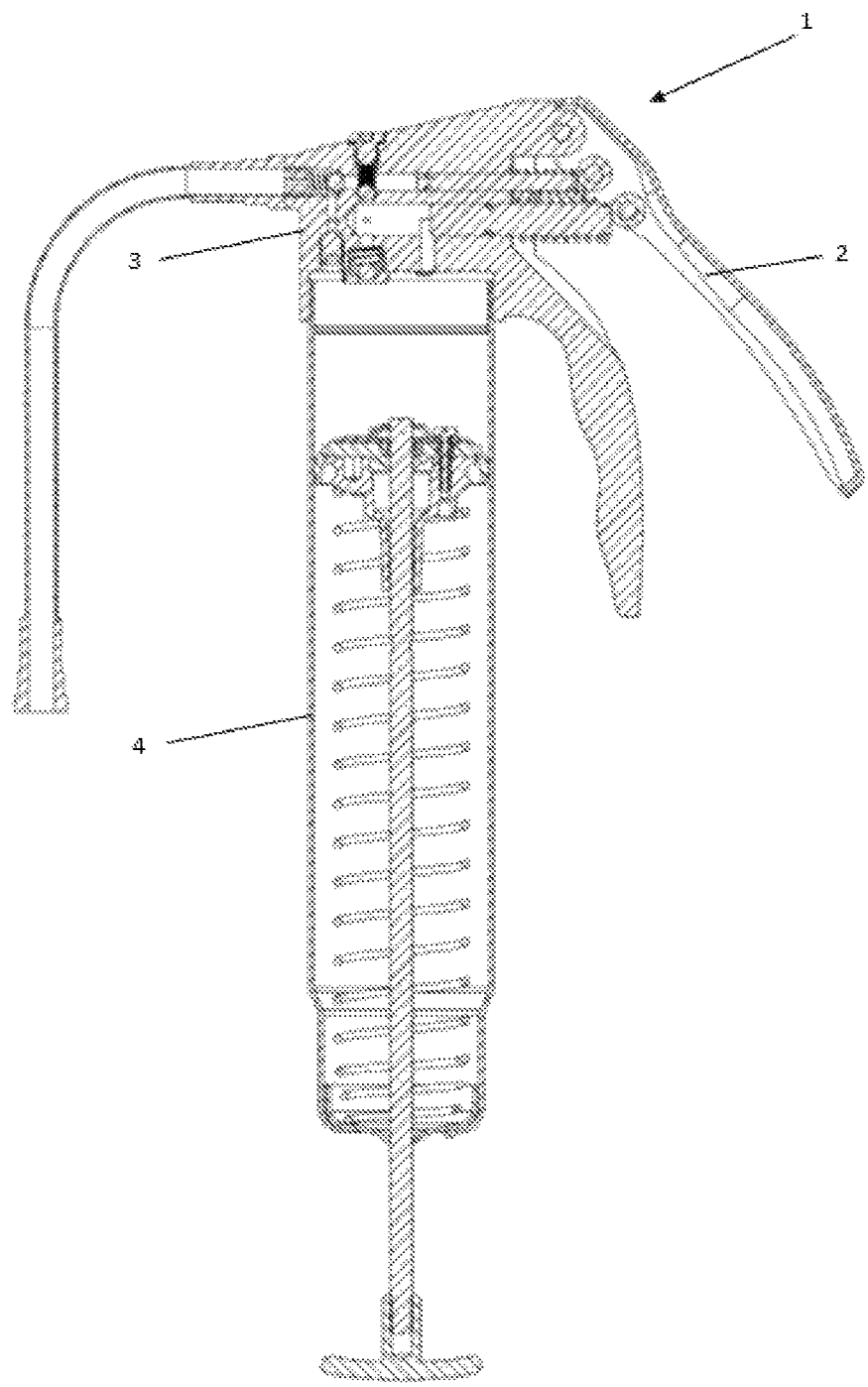
FIG. 1 is a cross-sectional view of a grease gun in accordance with a first embodiment of the present disclosure.

The present disclosure relates to a grease gun 1. The grease gun 1 includes an actuator, in the form of handle 2, and a body 3, as shown in FIG. 1. In use, body 3 is connected to a container, for example in the form of a grease barrel 4. In the detailed embodiment, body 3 is coupled to grease barrel 4. The grease barrel is designed for filling through standard grease cartridges or bulk filled from a grease source. When grease barrel 4 is empty, if using grease cartridges, grease barrel 4 will be uncoupled from body 3 to access and replace the cartridge; if bulk filled instead, when grease barrel 4 is empty, it can be connected to a grease source through filler/bleeder 34 for refilling (see FIGS. 8 and 9).

The grease gun will now be described in further detail with respect to FIGS. 2 and 3, which provide cross-sectional views through the body 3 of the grease gun 1. The body 3 includes a first elongate chamber 5 and second elongate chamber 6. Second chamber 6 has a smaller cross-sectional area relative to first chamber 5 and is configured to contain a smaller volume of grease than first chamber 5. In the detailed embodiment, first chamber 5 and second chamber 6 are circular in cross-section and second chamber 6 is of a smaller diameter relative to first chamber 5. First chamber 5 extends along a first axis A and second chamber 6 extends along second axis B, the axes being spaced apart. In the detailed embodiment shown in FIGS. 2 and 3, first axis A and second axis B are substantially parallel to one another. First piston 7 is moveable within first chamber 5 such that it moves (horizontally translates) along first axis A. Second piston 8 is moveable within second chamber 6 such that it moves (horizontally translates) along second axis B. Provided the pistons are still able to be actuated in the same phase by handle 2, the axes may not be parallel to one another. First piston 7 is fitted with positive seal 7A to form a liquid-tight engagement with first chamber 5. Second piston 8 is fitted with positive seal 8A to form a liquid-tight engagement with second chamber 6. In the detailed embodiment, the positive seals are in the form of an O-ring, although they may take other forms such as, for example, an O-ring with a backup ring, a rod seal, or a lip seal.

First piston 7 and second piston 8 reciprocate along first axis A and second axis B respectively by movement of handle 2 by a user between a retracted position and an engaged position via an intermediate position between the two positions (not shown). When handle 2 is in the retracted position, the first piston 7 is located a position within first chamber 5 that the first piston 7 does not block the flow of grease from grease barrel 4 into first chamber 5 via primary grease channel 9. In other words, the first piston 7 is disposed at a retracted position within the first chamber 5. As handle 2 moves from its retracted to its intermediate position (i.e. towards the engaged position of the actuator, which corresponds with an extended position of the first piston 7), first piston 7 advances (e.g. translates horizontally along axis A) within first chamber 5 and progressively obstructs and eventually closes (e.g. blocks) primary grease channel 9.

Handle 2 is pivotally connected to body 3 by way of pin 10. This permits handle 2 to be pivoted between the retracted position and the engaged position with respect to body 3. First piston 7 and second piston 8 are also connected to handle 2 by way of lugs 11 which are located on handle 2. In the detailed embodiment, lugs 11 are in the form of metal rollers on rods extending through handle 2. In the section of first piston 7 and second piston 8 between handle 2 and body 3 are first and second biasing means, which are disposed around first piston 7 and second piston 8, respectively. In the detailed embodiment, first and second biasing means are in the form of first biasing spring 12 and second biasing spring 13, although other biasing means are also contemplated in this disclosure. First biasing spring 12 and second biasing spring 13 are compression springs that are configured to bias handle 2 towards the retracted position. Therefore, when a user removes the pressure on handle 2, handle 2 will pivot towards the retracted position, where it will remain until further pressure is applied to handle 2 by a user.

Tertiary grease channel 14 is open and permits the flow of grease from grease barrel 4 into first chamber 5 when the handle is in the retracted position and the intermediate position. As handle 2 moves from the intermediate position to the engaged position, first piston 7 advances within first chamber 5 and progressively obstructs and eventually closes tertiary grease channel 14. Tertiary grease channel 14 contains a non-return valve, shown in the form of a spring loaded non-return valve 15, which, when open, permits the flow of grease through tertiary grease channel 14 from grease barrel 4 into first chamber 5 but restricts the flow of grease through tertiary grease channel 14 from first chamber 5 back into grease barrel 4. By default, non-return valve 15 is closed and it is only opened if the grease in grease barrel 4 exerts enough pressure on non-return valve 15 to overcome the biasing force from the spring. In the illustrated embodiment, non-return valve 15 prevents the flow of grease from first chamber 5 back into grease barrel 4. First chamber 5 and second chamber 6 are in fluid communication with one another by way of secondary grease channel 16. Once first piston 7 closes the primary grease channel 9, back pressure is increased on the grease in first chamber 5 due to the grease in first chamber 5 being restricted to a volume of decreasing size as first piston 7 progresses within first chamber 5 along first axis A. The grease cannot travel back into grease barrel 4 due to the closure of primary grease channel 9 and due to non-return valve 15.

Secondary grease channel 16 contains a non-return valve, shown in the form of a spring loaded non-return valve 17. By default, non-return valve 17 is closed and it is only opened if the grease in first chamber 5 exerts enough pressure on non-return valve 17 to overcome the biasing force from the spring. As first piston 7 moves further within first chamber 5 along first axis A and the pressure on the grease within first chamber 5 increases as a result of the decreasing volume, non-return valve 17 is opened and grease can pass from first chamber 5 into second chamber 6. Non-return valve 17 permits the flow of grease from first chamber 5 through secondary grease channel 16 into second chamber 6 but restricts the flow of grease from second chamber 6 back into first chamber 5. In the illustrated embodiment, non-return valve 17 prevents the flow of grease from second chamber 6 back into first chamber 5.

First piston 7 and second piston 8 are reciprocated in the same phase by the movement of handle 2. Therefore, when first piston 7 is advancing within first chamber 5 along first axis A, second piston 8 is also advancing within second chamber 6 along second axis B. When grease enters second chamber 6 from first chamber 5 through secondary grease channel 16, it is pushed by second piston 8 into an outlet chamber 18. In this way, second piston 8 extrudes the combined volume of grease displaced by both first piston 7 and second piston 8 through outlet chamber 18. Outlet chamber 18 contains a non-return valve, shown in the form of a spring loaded non-return valve 19. By default, non-return valve 19 is closed and it is only opened if the grease in second chamber 6 exerts enough pressure on non-return valve 19 to overcome the biasing force from the spring. When open, non-return valve 19 permits the flow of grease from second chamber 6 into outlet chamber 18, but restricts the flow of grease from outlet chamber 18 back into second chamber 6. In the illustrated embodiment, non-return valve 19 prevents the flow of grease from outlet chamber 18 back into second chamber 6.

Outlet chamber 18 also contains grease outlet 20. In use, the grease from outlet chamber 18 will flow out of grease out of grease gun 1 via grease outlet 20 on the movement of handle 2 from the retracted position to the engaged position (e.g. as the pistons move towards their respective extended positions). In this way grease is able to be applied to the relevant area of a vehicle, machinery or other equipment that requires lubrication at a specific location.

Figure 2:
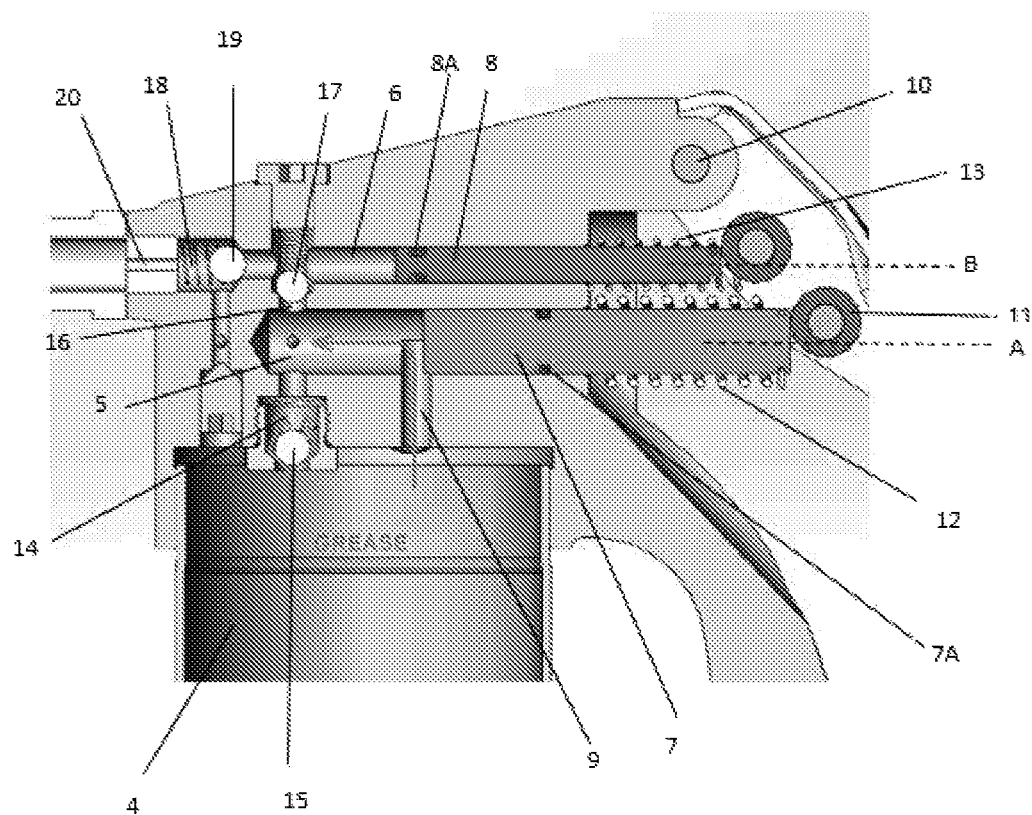
FIG. 2 is a cross-sectional view of the grease gun of FIG. 1 showing the location of the first and second pistons when the actuator is in the retracted position.
Figure 3:
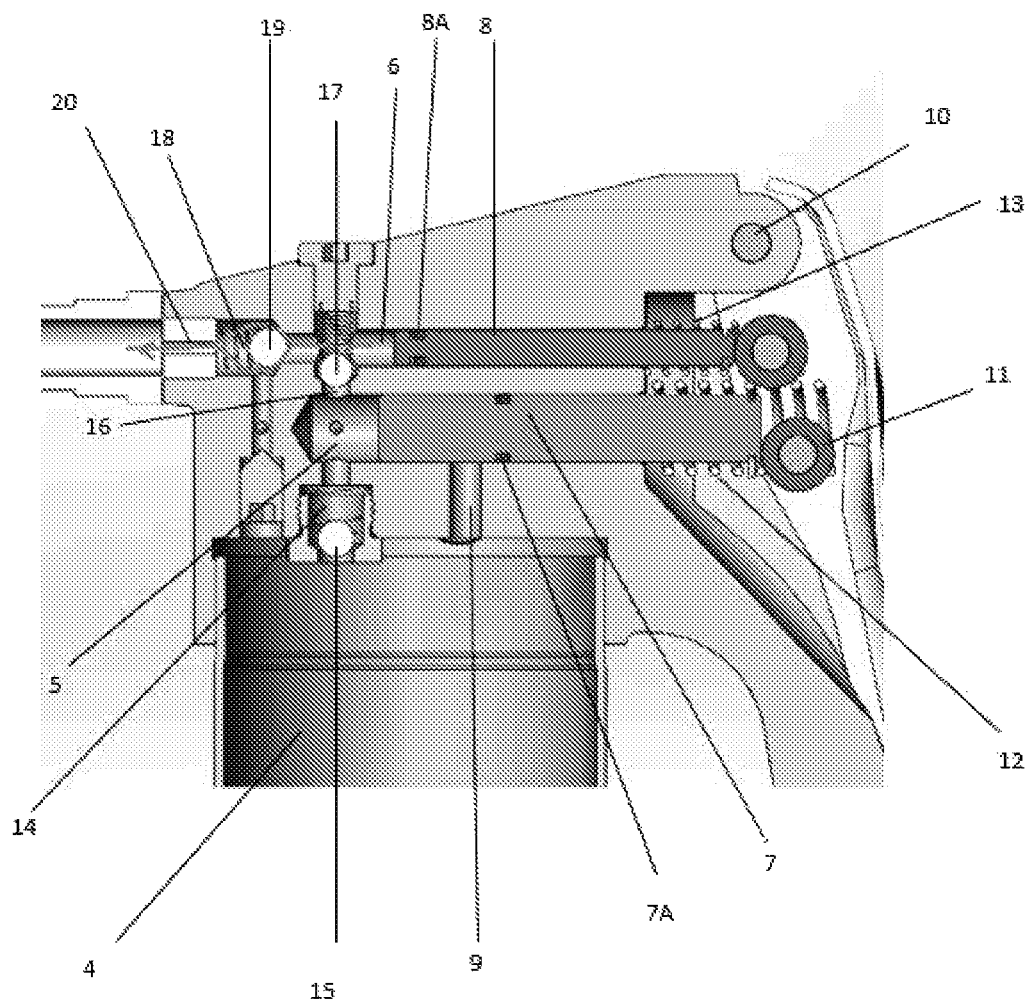
FIG. 3 is a cross-sectional view of the grease gun of FIG. 1 showing the location of the first and second pistons when the actuator is in the engaged position.

As shown in FIGS. 2 and 3, in order for grease to flow through primary grease channel 9, handle 2 must be in or close to (e.g. positioned towards) the retracted position. By enabling grease to flow into the first chamber 5 by way of both primary grease channel 9 and tertiary grease channel 14 provides a maximum amount of grease to be collected in each stroke, therefore maximising the amount of grease that can flow out of grease outlet 20. However, it may be that a user only requires a small volume output of grease (typically when greasing against high backpressure). In this way, it is possible to operate handle 2 with only short partial strokes such that handle 2 only travels between the intermediate position and the retracted position, and primary grease channel 9 remains closed. In this operation, the flow of grease into first chamber 5 in a particular stroke of handle 2 is only from tertiary grease channel 14. These shorter strokes limit the effort on the handle by a user when only a small volume output is required, compared with the effort required to move the handle through a full stroke from the retracted position to the engaged position.

Figure 4:
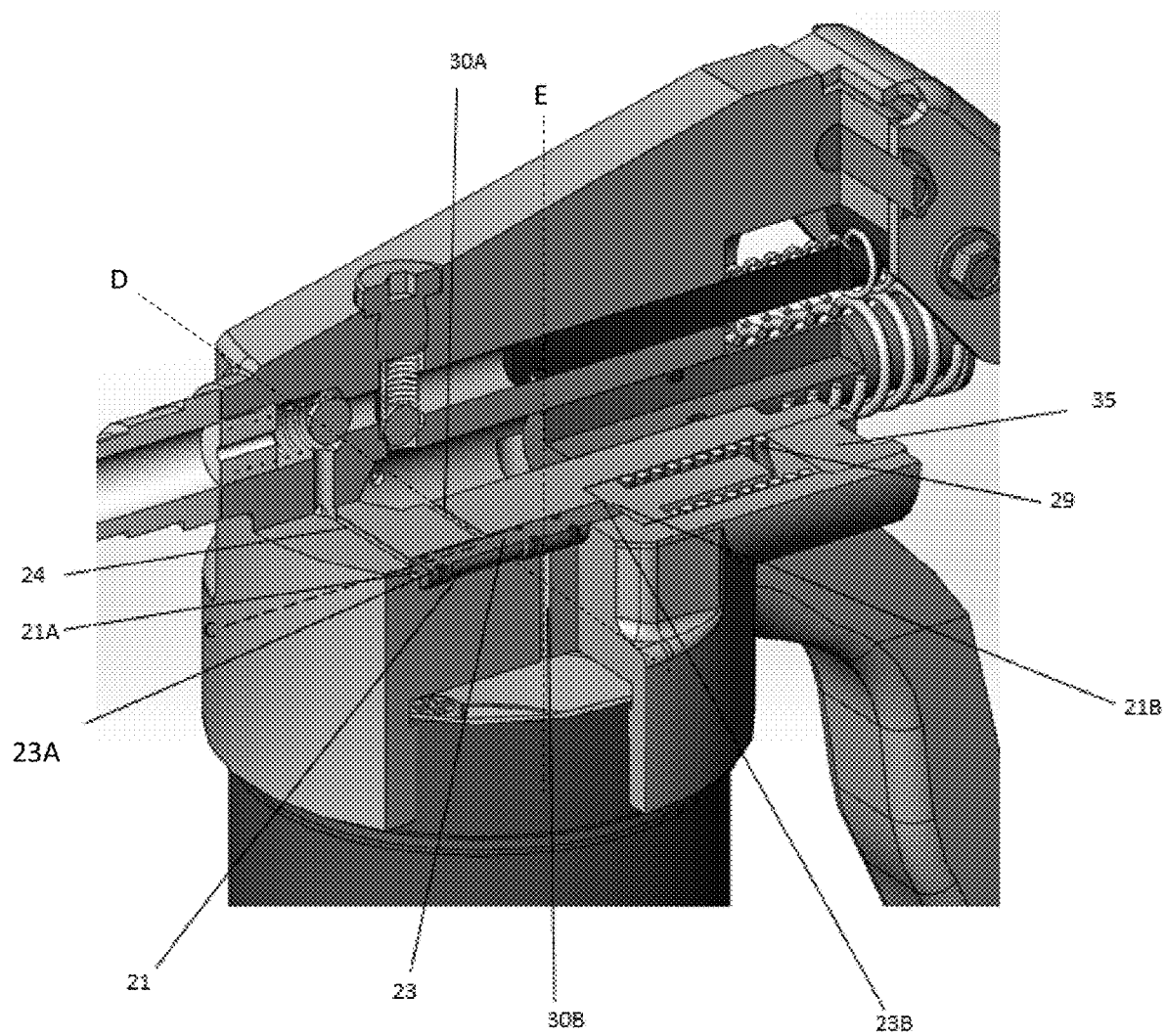
FIG. 4 is a cross-sectional view of the grease gun of FIG. 1 with the spool in the closed position.
Figure 5:
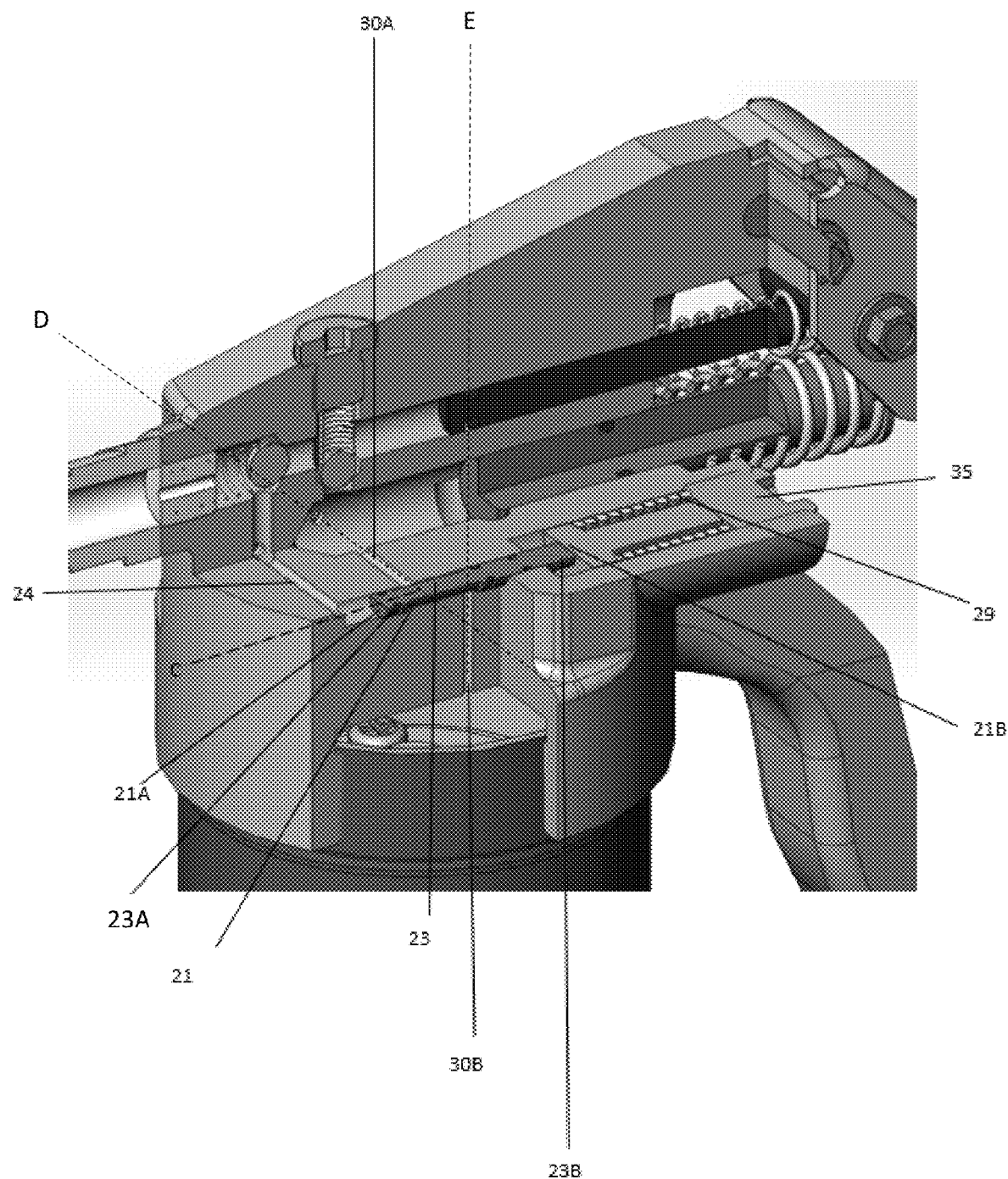
FIG. 5 is a cross-sectional view of the grease gun of FIG. 1 with the spool in the open position.
Figure 6:
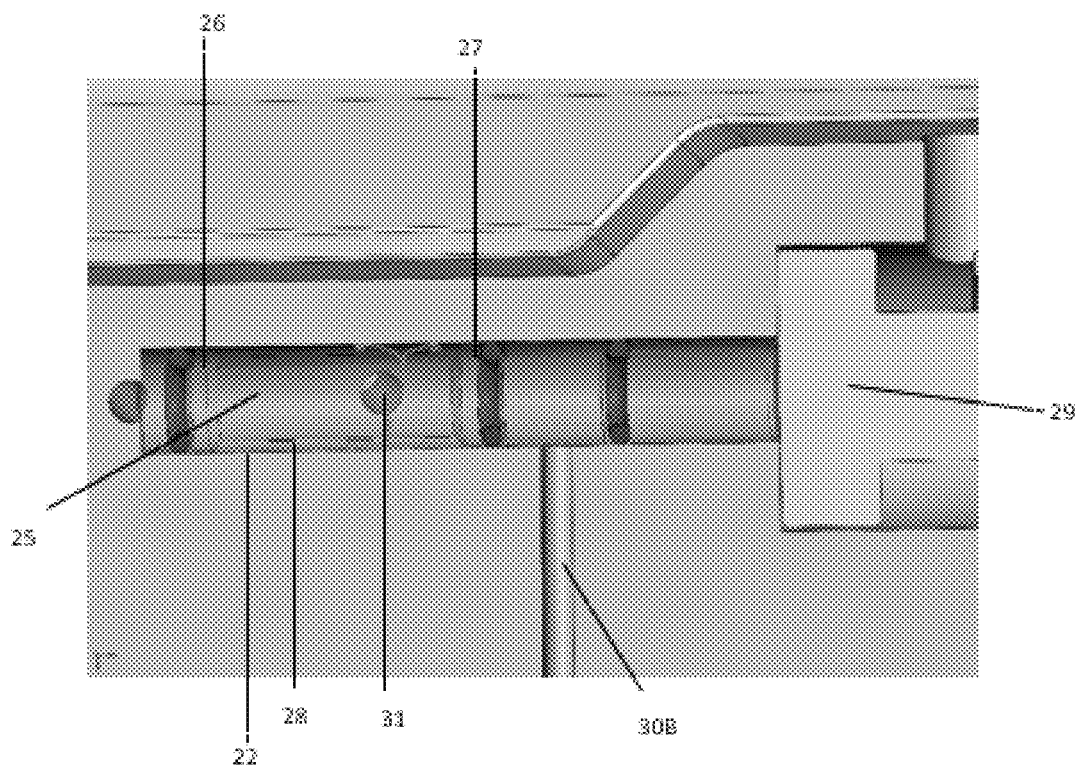
FIG. 6 is a cross-sectional view of the grease gun of FIG. 1 with the pressure sensitive spool in the closed position.
Figure 7:
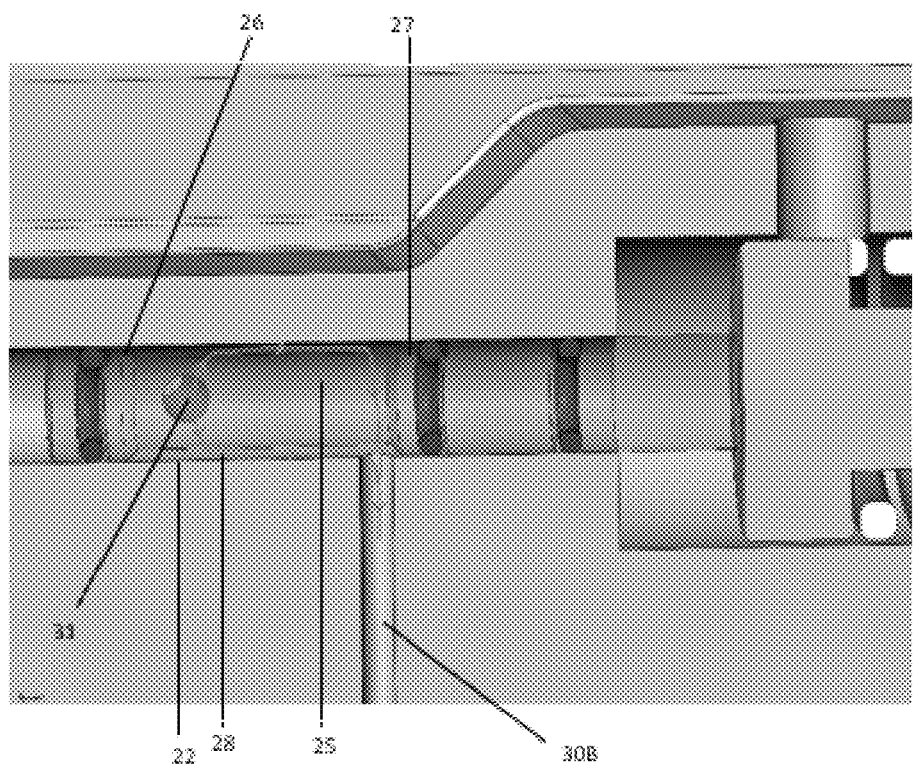
FIG. 7 is a cross-sectional view of the grease gun of FIG. 1 with the pressure sensitive spool in the open position.
Figure 8:
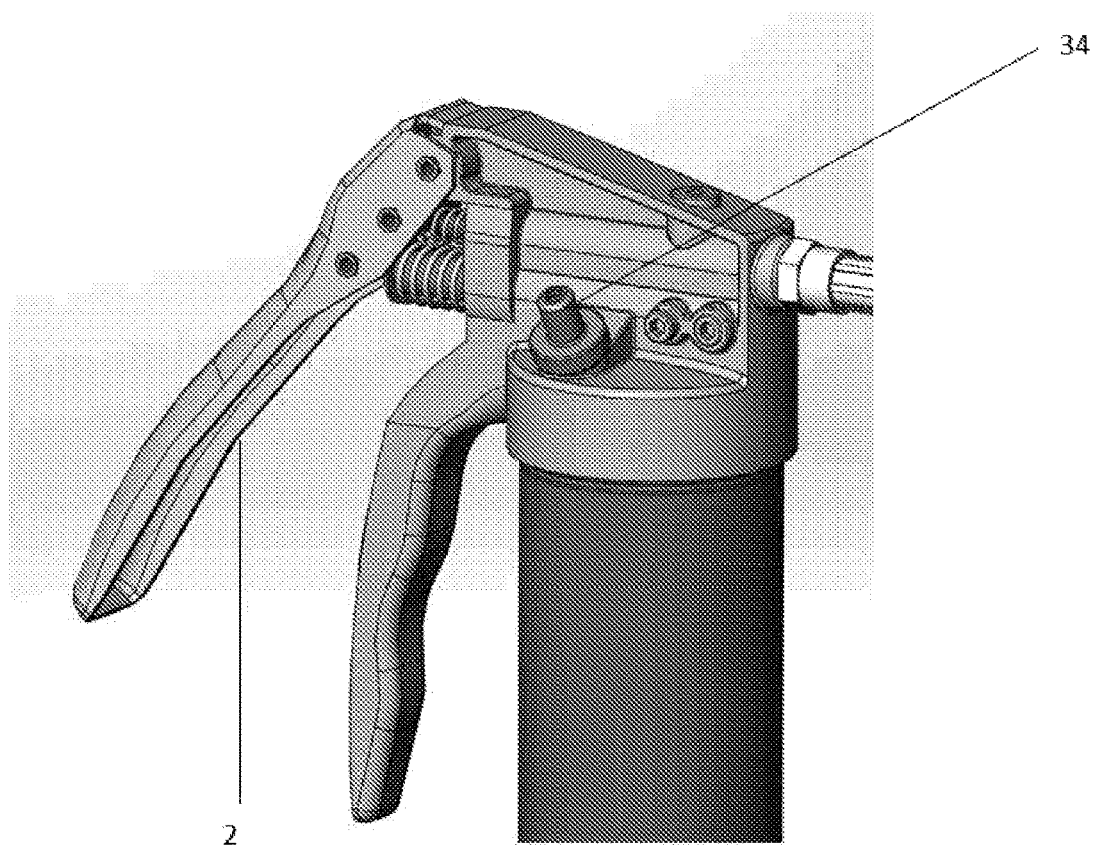
FIG. 8 is a perspective view of the body of the grease gun of FIG. 1 showing the filler/bleeder.
Figure 9:
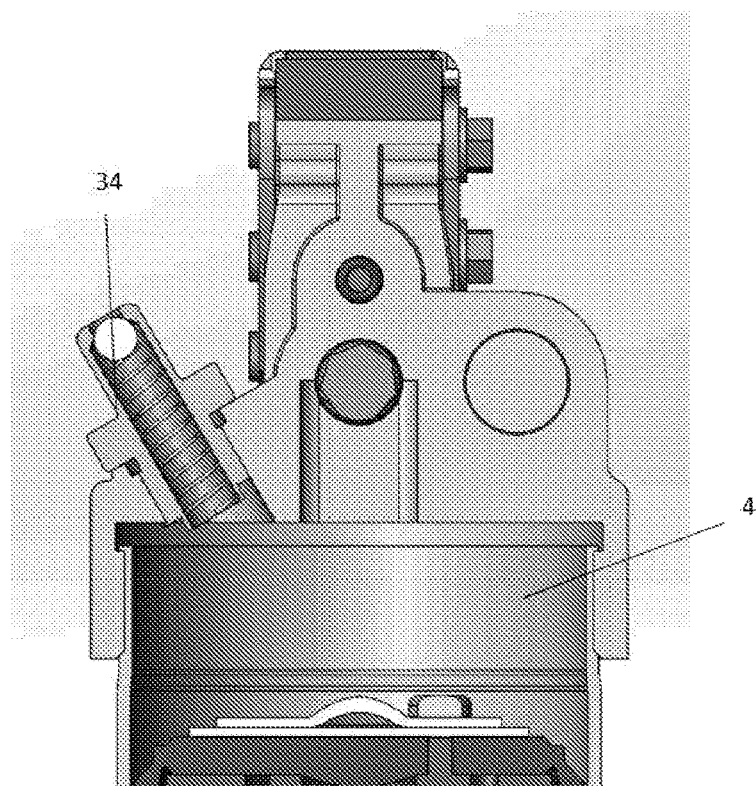
FIG. 9 is a cross-sectional view through the body of the grease gun of FIG. 1.

The grease gun will now be described in further detail with respect to FIGS. 4-7. As shown in FIGS. 4 and 5, in the detailed embodiment, the body 3 of grease gun 1 further contains spool channel 21 which extends along a third axis C. As is shown in FIGS. 6 and 7, spool channel 21 is bound (e.g. defined) by wall 22 (e.g. the channel 21 is formed within the body 3 of the grease gun 1). Third axis C is parallel to first axis A and second axis B, although there is no requirement that it be parallel to these axes. Third axis C could be any angle to first axis A and second axis B between parallel and perpendicular. Moveable within spool channel 21 is spool 23. In the detailed embodiment, spool 23 translates between an open position and a closed position.

Disposed at a first end 21A of spool channel 21 is pressure channel 24 which is in fluid communication with outlet chamber 18. When there is grease within outlet chamber 18, a portion of the grease will pass along pressure channel 24. In the detailed embodiment, pressure channel 21 is disposed perpendicular to the spool channel 21.

Spool 23 has a mid-section 25. The mid-section 25 of the spool 23 is disposed between a first annular ring 26 and second annular ring 27 of the spool 23. In the detailed embodiment, the mid-section 25, first annular ring 26 and second annular ring 27 of the spool 23 are integrally formed components. Mid-section 25 has a smaller diameter than the diameter of spool channel 21, and the diameter of first annular ring 26 and second annular ring 27. This arrangement creates a gap, in the form of a communication channel 28, between the mid-section 25 and the surrounding wall 22 of the spool channel 21. First annular ring 26 and second annular ring 27 are fitted with high pressure seals and form a liquid-tight engagement with wall 22 of the spool channel 21 such that grease is prevented from passing from pressure channel 24 into the channel 28 around mid-section 25 by first annular ring 26 and grease is prevented from passing out of the channel 28 around mid-section 25 by first annular ring 26 and second annular ring 27. In other words, the area (e.g. gap) between mid-section 25, first annular ring 26, second annular ring 27 and wall 22 forms communication channel 28.

Regardless of whether spool 23 is in the open position or the closed position, a first end 23A of spool 23 is offset from the first end 21A of spool channel 21 so that grease from pressure channel 24 is able to flow into the portion of the spool channel 21 adjacent the first end 23A of spool 23.

At a second end 21B of spool channel 21 is a third biasing means, shown in the form of a third biasing spring 29, although other biasing means are also contemplated in this disclosure. Third biasing spring 29 is adjacent to second end 23B of spool 23 and biases spool 23 into the closed position.

Between first chamber 5 and grease barrel 4 is a bypass channel, which includes a primary bypass channel 30A and secondary bypass channel 30B. Primary bypass channel is disposed between first chamber 5 and spool channel 21 such that when there is grease in first chamber 5, it will flow through primary bypass channel 30A into the communication channel 28. Secondary bypass channel 30B is disposed between spool channel 21 and grease barrel 4. In the illustrated embodiment, primary bypass channel axis (extends along the longitudinal axis of the primary bypass channel) and secondary bypass channel axis (extends along the longitudinal axis of the secondary bypass channel) are substantially perpendicular to each other and offset from one other with respect to spool channel 21. In the detailed embodiment, when grease gun 1 is in an upright position, primary bypass channel axis D forms a horizontal axis and secondary bypass channel axis E forms a vertical axis. In this way, the section of spool channel 21 that connects to primary bypass channel 30A is spaced apart from the second of spool channel 21 that connects to secondary bypass channel 30B. Therefore, any grease from primary bypass channel 30A that passes into spool channel 21 must pass along at least a portion of the length of spool channel 21 before passing into secondary bypass channel 30B.

As shown in FIG. 6, when spool 23 is in the closed position, communication channel 28 is not located adjacent to secondary bypass channel 30B. This means that communication channel 28 is spaced from, and therefore not in fluid communication with, the secondary bypass channel 30 B. As a result, in the closed position, any grease in communication channel 28 will not pass into secondary bypass channel 30B.

As shown in FIG. 7, when spool 23 is in the open position, communication channel 28 is located adjacent secondary bypass channel 30B. This means that it is in fluid communication with secondary bypass channel 30B and any grease in communication channel 28 will pass into secondary bypass channel 30B and then into grease barrel 4.

Mid-section 25 may also contain cavity 31. As shown in FIG. 6, grease will flow from primary bypass channel 30A through cavity 31 into communication channel 28. In the detailed embodiment, cavity 31 extends through mid-section 25 in the same orientation as primary bypass channel 30A and substantially perpendicular to the orientation of secondary bypass channel 30B. As shown in FIG. 6, when spool 23 is in the closed position, although grease can flow along primary bypass channel 30A through cavity 31 into communication channel 28, it will be prevented by secondary annular ring 27 from passing into secondary bypass channel 30B.

As set out above, third biasing spring 29 biases spool 23 into the closed position. If there is a blocked greasing point, the grease pressure in outlet chamber 18 will increase with each stroke of handle 2. Due to non-return valve 19, the grease from outlet chamber 18 is restricted from returning to second chamber 6. However, it is not restricted from passing along pressure channel 24 into spool channel 21. In this way, the grease located between first end 21A of spool channel 21 and first end 23A of spool 23 will be under increased pressure. At an adjustable pre-determined level of pressure (for example, a level set to an amount between 1000 psi and 3000 psi, preferably between 1500 psi and 2500 psi, most preferably 2000 psi) the force from this pressure will be greater than the force exerted by third biasing spring 29, resulting in spool 23 being moved against third biasing spring 29 from the closed position to the open position. The pressure from the grease in outlet chamber 18 will keep spool 23 in the open position while grease outlet 20 remains blocked.

Figure 10:
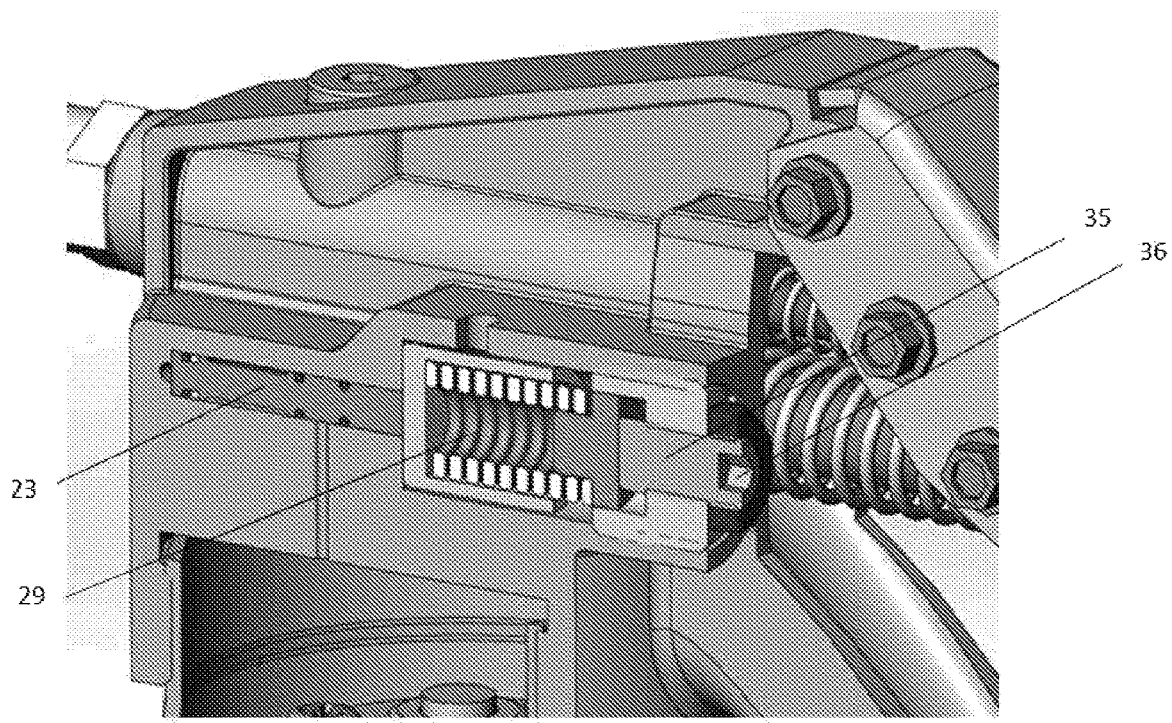
FIG. 10 is another cross-sectional view through the body of the grease gun of FIG. 1 with the third biasing spring in a high pre-loaded state.
Figure 11:
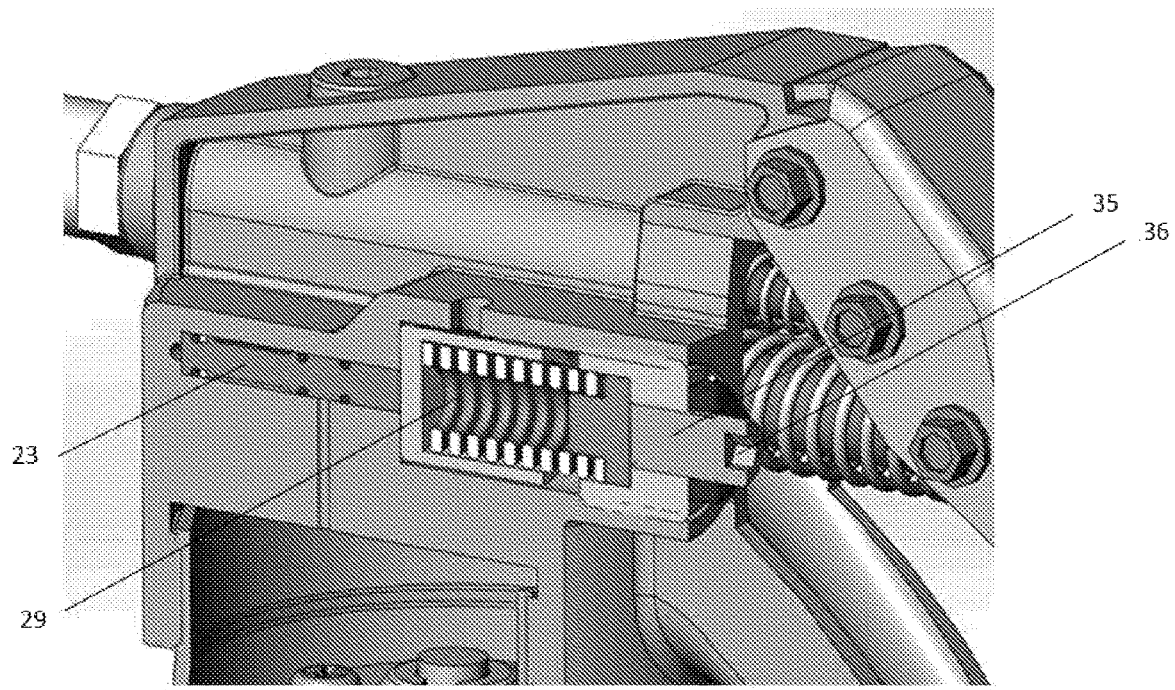
FIG. 11 is another cross-sectional view through the body of the grease gun of FIG. 1 with the adjustment screw in a low pre-loaded state.

In the detailed embodiment, the pre-determined level of pressure of third biasing spring 29 is set by adjustment screw 35. As shown in FIGS. 10 and 11, adjustment screw 35 is located at the end of third biasing spring 29 opposite to the end of third biasing spring 29 that engages with spool 29. Adjustment screw 35 has a tool engaging portion 36 that is located external to the body. Tool engaging portion 36 may be any suitable shape. For example, tool engaging portion 36 may be a hex shape, as shown in FIGS. 10 and 11. Tightening and loosening of adjustment screw 35 by way of rotation of adjustment screw 35 by means of tool engaging portion 36 permits a user to alter the preload of third biasing spring 29 such that tightening of adjustment screw 35 will increase the pre-load on third biasing spring 29 and increase the pre-determined level of pressure required to overcome the force exerted by third biasing spring 29 (as shown in FIG. 10) and loosening of adjustment screw 35 will decrease the pre-load on third biasing spring 29 and decrease the pre-determined level of pressure required to overcome the force exerted by third biasing spring 29 (as shown in FIG. 11).

Figure 12:
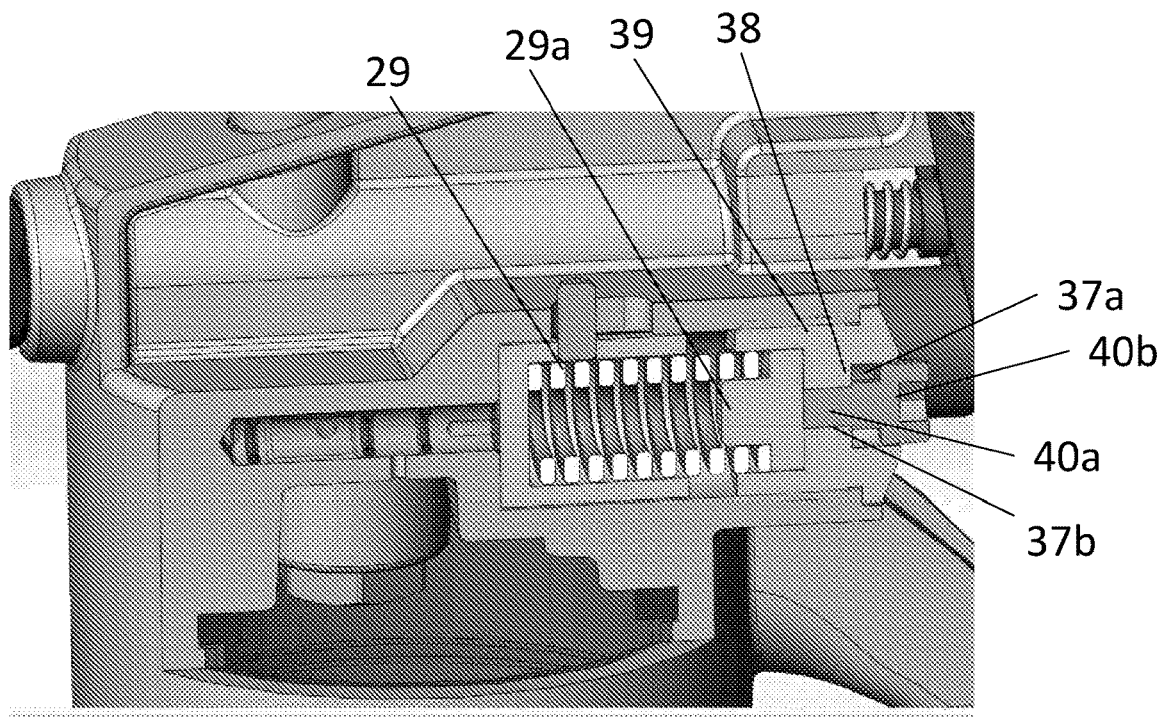
FIG. 12 provides a cross-sectional view through a second embodiment of the grease gun.
Figure 13:
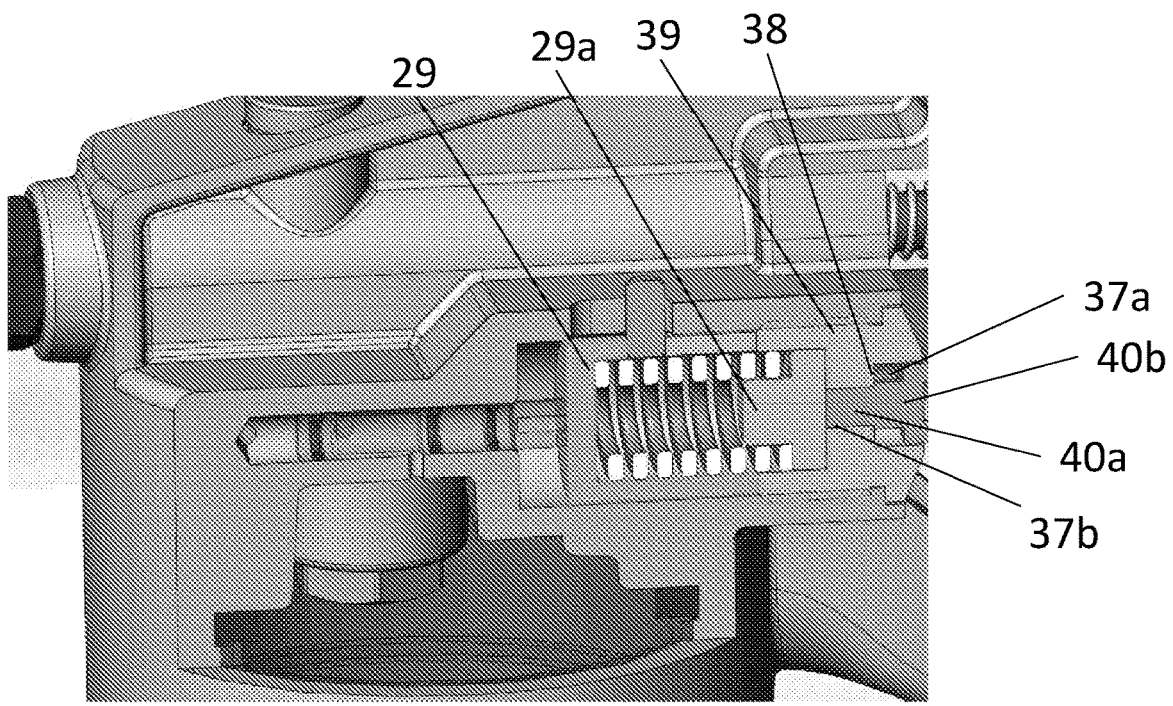
FIG. 13 provides another cross-sectional view through the grease gun shown in FIG. 12.
Figure 14:
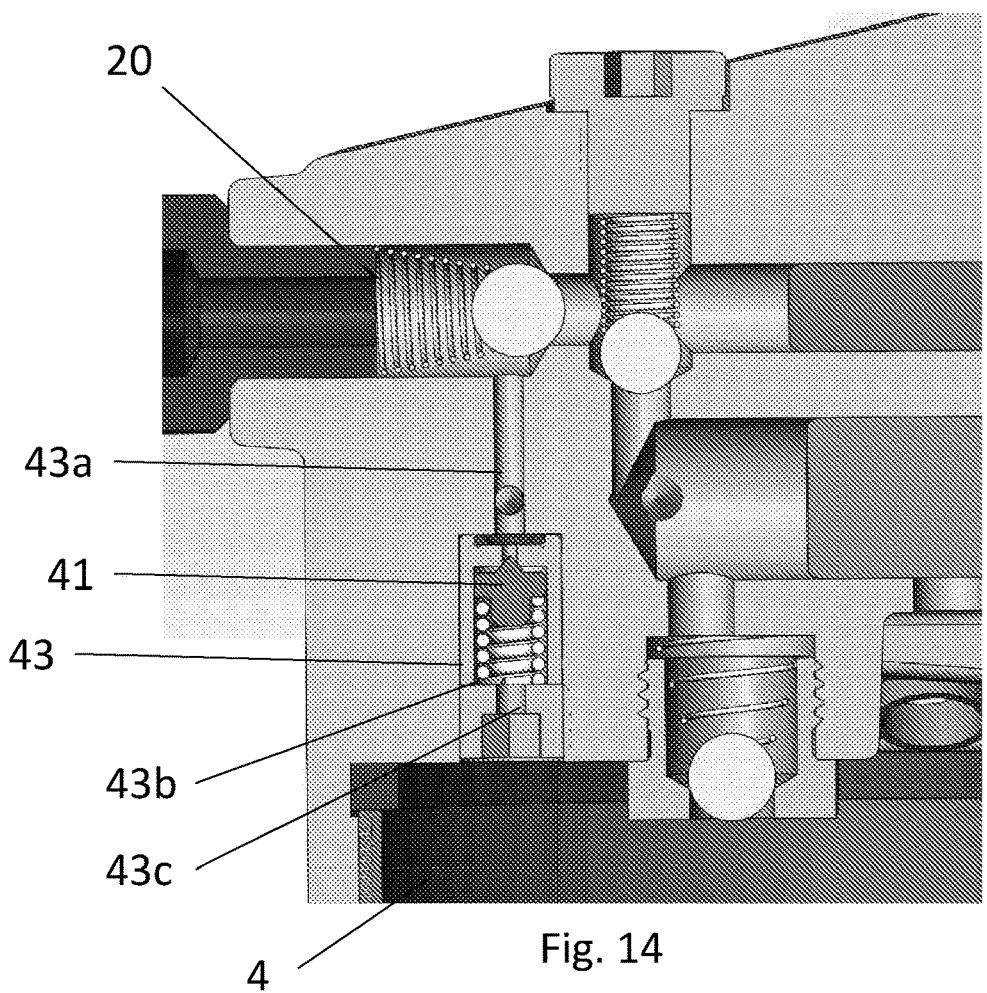
FIG. 14 provides a cross-sectional view through a third embodiment of the grease gun.
Figure 15:
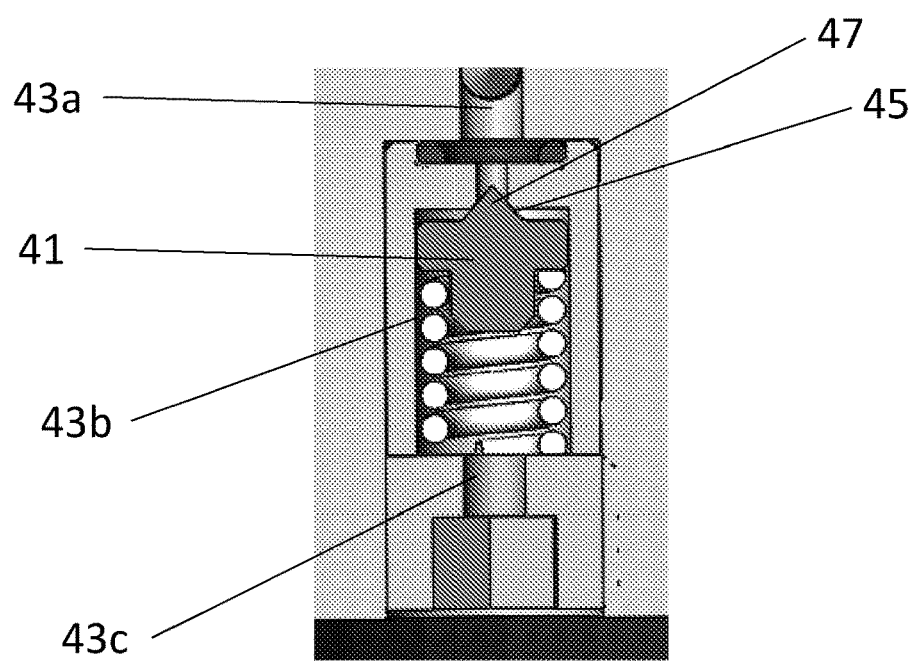
FIG. 15 provides another cross-sectional view through the pressure relief valve in the grease gun shown in FIG. 14.

An alternate embodiment of the means configured to enable the pre-determined level of pressure of third biasing spring 29 is shown in FIGS. 12 and 13. In contrast to the embodiment described with respect to FIGS. 10 and 11, whereby the aperture through which the adjustment screw 35 extended was of uniform diameter, the aperture is stepped (e.g. varies in diameter). The aperture includes a first portion 37a and a second portion 37b. The first portion 37a of the aperture has a greater diameter relative to the second portion 37b of the aperture. An annular wall 38 of the surrounding barrel 39 is formed at the juncture between the first 37a and second 37b portions (e.g. where the aperture expands in diameter). In contrast to the embodiment described with respect to FIGS. 10 and 11, whereby the adjustment screw is of substantially uniform diameter, the adjustment screw shown in FIGS. 12 and 13 has an elongate narrow portion 40a and a head 40b. The head 40b of the adjustment screw is configured to threadedly engage the first portion 41a of the aperture. The elongate narrow portion 40a is configured to extend through the second portion 37b of the aperture to engage the spring 29 (or an engagement mechanism 29a that cooperates with the spring 29, as is shown in the detailed embodiments). The adjustment mechanism is able to be controlled in a similar manner to that described above with respect to FIGS. 10 and 11.

The length of the head 40b and elongate portion 40a of the adjustment screw, along with the length of the first 37a and second 37b portions of the aperture are configured to limit the distance that the adjustment screw is able to be inserted into the aperture. Tightening and loosening of adjustment screw by way of rotation of adjustment screw by means of the tool engaging portion (similar to that described above with respect to FIGS. 10 and 11) permits a user to alter the preload of third biasing spring 29 such that tightening of adjustment screw will increase the preload on third biasing spring 29 and increase the pre-determined level of pressure required to overcome the force exerted by third biasing spring 29 (as shown in FIG. 12). Loosening of the adjustment screw will decrease the preload on third biasing spring 29 and thereby decrease the pre-determined level of pressure required to overcome the force exerted by third biasing spring 29 (as shown in FIG. 13). This design enables over-compressing of the spring, relative to the embodiment described in FIGS. 10 and 11, to be reduced or avoided altogether. The adjustment screw stops against the annular wall 38 of the barrel 39 and sits against it after a predetermined number of rotations of the adjustment screw (e.g. 3 turns), thus providing a mechanical stop to protect the spring from over-compression.

When spool 23 is in the closed position, the grease gun is considered to be operating in a "high flow mode". In the high flow mode, all grease contained in first chamber 5 is directed to second chamber 6, for passage into outlet chamber 18 and then grease outlet 20. In this mode, first piston 7 and second piston 8 experience the same back pressure and the actuation of handle 2 requires enough force to advance the two pistons against the back pressure.

When spool 23 is in the open position, the grease gun is considered to be operating in a "high pressure mode". In high pressure mode, primary bypass channel 30A and secondary bypass channel 30B are connected by way of communication channel 28 and a substantial quantity of the grease that enters first chamber 5 through primary grease channel 9 and tertiary grease channel 14 will flow back out of first chamber 5 by way of bypass channel 30 back into grease barrel 4. This quantity varies depending on a number of parameters including backpressure level in the chamber, actuation speed of the trigger, grease viscosity, temperature, etc.

When bypass channel 30 is in open position, grease in first chamber 5 will follow the path of least resistance through bypass channel 30 back into grease barrel 4. However, an amount of backpressure will still be created in first chamber 5 while first piston 7 advances due to the smaller size of the exit channel out of first chamber 5 (bypass channel 30) compared with the size of the entry channels into first chamber 5 (tertiary grease channel 14 and/or primary grease channel 9, as shown in FIG. 2. Depending on the backpressure level into first chamber 5, and whether it is sufficient to open non-return valve 17, some or none of the grease in first chamber 5 will pass along secondary grease channel 16 through non-return valve 17 into second chamber 6. As at least the majority of the grease from first chamber 5 will flow through bypass chamber 30, the actuation of handle 2 only requires the force to advance the second piston 8 against the backpressure in second chamber 6, as the backpressure on first piston 7 in first chamber 5 will be minimal. This makes the actuation of handle 2 from the retracted position to the engaged position more comfortable and easier for a user due to the relatively smaller force required to advance second piston 8, compared to the force required to advance both first piston 7 and second piston 8 together. The additional pressure able to be provided to second chamber 6 when the grease gun is in high pressure mode can increase the pressure in outlet chamber 18 to very high levels (for example, up to 10,000 psi), which may assist to remove the blockage in grease outlet 20.

Once the blockage is cleared and grease can again flow out of grease outlet 20, the pressure in outlet chamber 18 will be reduced, which will reduce the pressure in pressure channel 24, resulting in a reduction in the pressure on first end 23A of spool 23. Once the pressure is reduced such that the force on first end 23A is less than the force on 23B from third biasing spring 29, third biasing spring 29 will push spool 23 to the closed position.

A second embodiment of the grease gun will now be described with respect to FIGS. 14 to 17. The second embodiment of the grease gun shown in FIGS. 14 to 17 includes each of the features described above with respect to FIGS. 1 to 13, with the addition of a pressure relief valve 41 and corresponding channel 43 within which the valve 41 is positioned. As will be evidence to the skilled addressee, the pressure relief valve may also be implemented into alternate forms of a grease gun (e.g. with alternative features to that described with respect to FIGS. 13 to 17). The pressure relief valve 41 is configured to limit the maximum pressure that the grease gun can generate at the outlet 20. This feature provides a safety measure if required to protect the hose, coupler, and other mechanical components of the grease gun from overpressure-related failures and ultimately the user against resulting hazards. Typically, manual grease guns do not include pressure relief valve because the need to limit the pressure they generate is not there since they typically are unable to generate enough pressures capable of creating safety concerns.

In the detailed embodiment, the pressure relief channel 43 is disposed perpendicular to the first and second chambers 5, 6. The pressure relief channel includes a first portion 43a, a second portion 43b and a third portion 43c that are able to be in fluid communication with one another. The first portion 43a is disposed towards the outlet chamber 20 (i.e. towards the top of the gun in use), the third portion 43c is disposed towards the grease chamber 4 and the second portion 43b is disposed intermediate the first 43a and third 43c portions. The cross-sectional diameter of the second portion 43b is greater than the cross-section diameter of the first 43a and third 43c portions. The second portion 43b is configured to house the valve 41.

The pressure relief valve 41 is in the form of a spring loaded needle that is biased towards a closed position (see FIGS. 14 and 15), whereby the valve 43 is seated against an annular wall 45 surrounding the first portion 43a of the pressure relief channel. The annular wall 45 is formed by the body of the grease gun at the juncture between the first 43a and second 43b portions of the pressure relief channel. In the closed position, fluid is unable to flow from the first portion 43a of the pressure relief channel to the second portion 43b of the pressure relief channel. In the detailed embodiment, the valve 41 includes a conical projection 47 that is configured to extend into the first portion 43a of the pressure relief channel and thereby seat against the annular wall 45.

Figure 16:
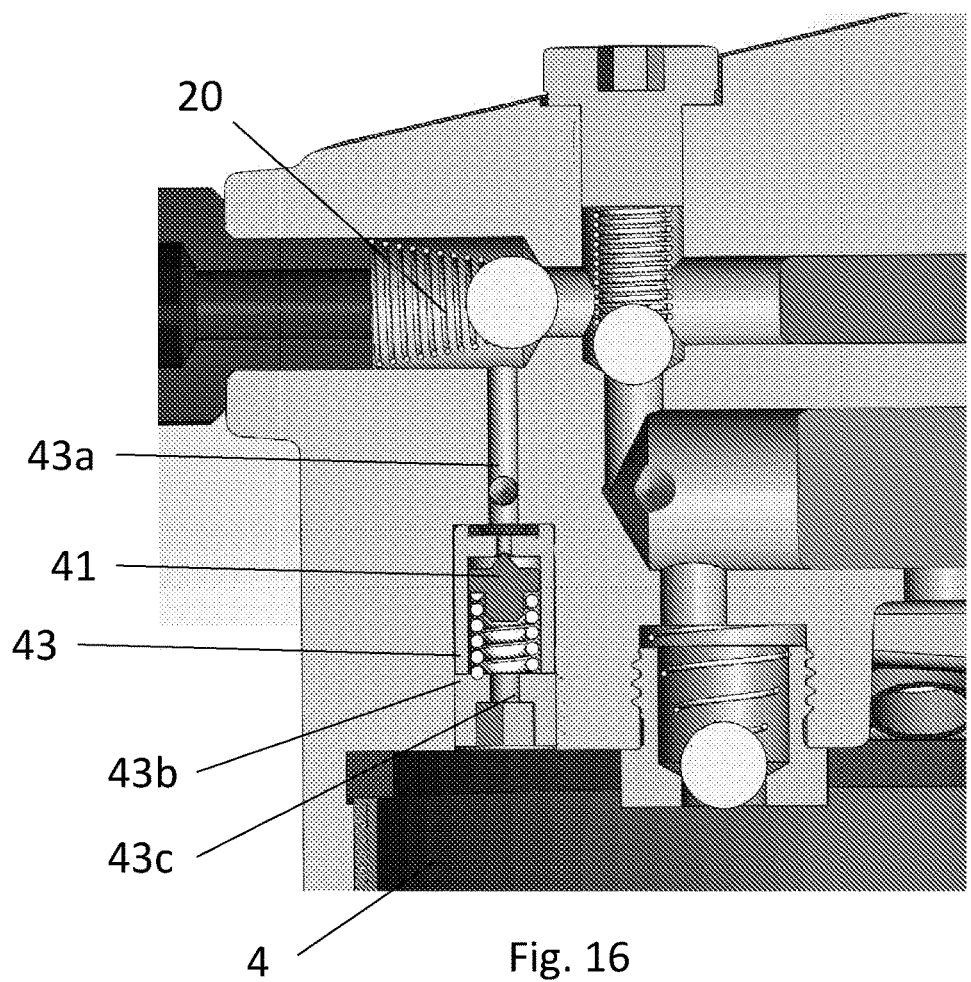
FIG. 16 provides another cross-sectional view through the grease gun shown in FIG. 14.
Figure 17:
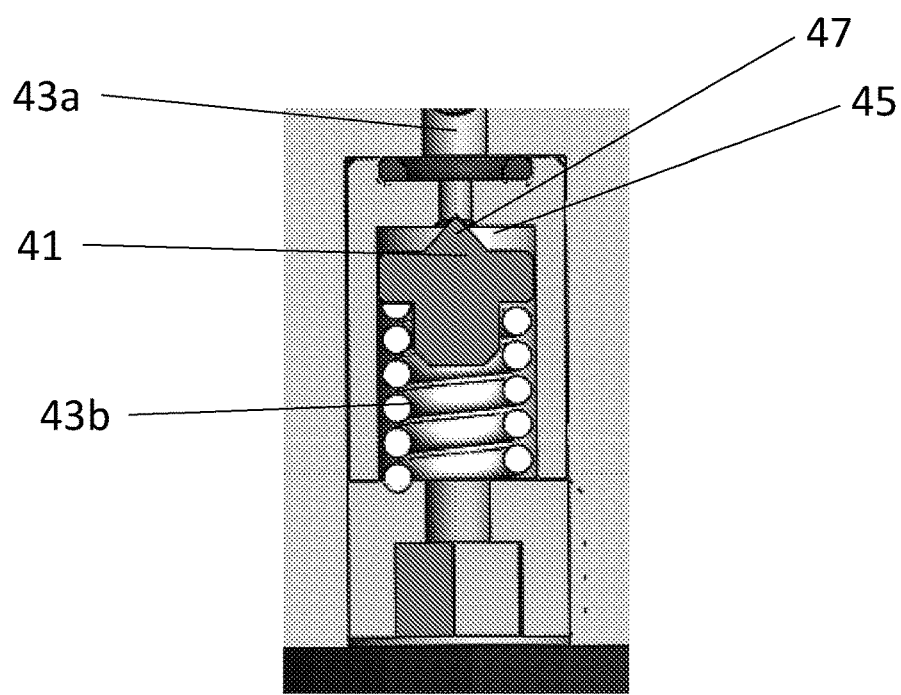
FIG. 17 provides another cross-sectional view through the pressure relief valve in the grease gun shown in FIG. 14.

FIGS. 16 and 17 show the pressure relief valve 41 in the open position. At a pre-determined pressure of grease at the outlet 20, the pressure of the grease contained in the first portion 41a of the pressure relief channel causes the valve 21 to translate against its bias within the second portion 41b of the pressure relief valve. In this position, the conical portion 47 of the valve 45 is retracted from the first portion 41a of the pressure relief valve (either fully or partially) and the valve 45 is spaced from the annular wall 45 to enable fluid to flow from the first portion 41a to the second portion 41b of the pressure relief channel. In this way, at a max pressure setting, fluid is able to flow from the outlet of the outlet 20 of the gun back to the grease barrel 4.

In other words, when the pressure at gun outlet 20 exceeds a design-set threshold value (for example 10000 psi) the hydraulic thrust on the valve 41 overcomes the bias force of the spring and as a result the valve 41 is cracked open, thus bleeding grease from the outlet 20 into the barrel 5. The bleed of grease from the outlet 20 to the barrel 4 is accompanied by a pressure drop. As the pressure drops at the outlet 20, the relief valve 41 closes and pressure is then able to be built in the gun outlet 20 again. As a result, the pressure at the gun outlet 20 is limited to the cracking pressure of the relief valve 41.

The pressure relief valve provides several advantages. The first is end-user safety, as discussed above, as it limits the max pressure that the gun can generate, thus protecting the relatively weak components (hose, fittings, coupler) from overpressure and in turn the end-user from incidents (high pressure grease injections). In addition, the built-in internal design channels the grease bleeding through the valve directly into the barrel. Typically, pressure relief valves on grease guns allow external grease oozing which is messy on the gun and can potentially cause a slipping hazard if grease blobs fall to the ground. Also, the pressure relief valve provides a tactile indication about when max pressure is reached, which informs the end-user that the blockage cannot be pressure-cleared (so it is pointless to keep on pumping) and needs to be mechanically cleared. When the valve opens up a 'click' may be audible and a sudden drop of force on the trigger may also can be sensed by the user.

The word 'comprising' and forms of the word 'comprising' as used in this description and in the claims does not limit the invention claimed to exclude any variants or additions.

Modifications and improvements to the invention will be readily apparent to those skilled in the art. Such modifications and improvements are intended to be within the scope of this invention.

The invention claimed is:

1. A grease gun comprising:
    a body able to be connected to a container configured to store grease, the body defining first and second elongate chambers therein, the first chamber extending along a first axis and the second chamber extending along a second axis, the first axis being spaced from the second axis, and the second chamber having a smaller cross-sectional area than the first chamber;
    first and second pistons, the first piston configured to reciprocate within the first chamber along the first axis and the second piston configured to reciprocate within the second chamber along the second axis, the second piston having a smaller cross-sectional area than the first piston;
    primary and secondary grease channels, the primary grease channel being disposed between the container and the first chamber such that the container is able to be fluidically connected to the first chamber, the secondary grease channel being disposed between the first and secondary chambers, and intermediate a length of the second chamber, such that grease is able to flow from the first chamber into the second chamber;
    an actuator connected to the body and moveable between a retracted position, whereby grease is able to flow through the primary grease channel, and an engaged position, whereby grease is restricted from flowing through the primary grease channel, the actuator being configured to cause reciprocation of the first piston and the second piston when moved between the engaged and retracted positions; and a grease outlet fluidically connected to the second chamber that allows for grease to be discharged from the grease gun.

2. The grease gun according to claim 1, further comprising a first non-return valve disposed in the secondary channel that allows grease to flow from the first chamber into the second chamber.

3. The grease gun according to claim 1, wherein the secondary grease channel is disposed intermediate the length of the first and second chambers.

4. The grease gun according to claim 1, wherein the secondary grease channel extends along a secondary grease channel axis that extends substantially perpendicular to the first and second axes.

5. The grease gun according to claim 1, further comprising an outlet cavity between the second chamber and the grease outlet, and a second non-return valve located in the outlet cavity which permits the flow of grease from the second chamber into the outlet cavity.

6. The grease gun according to claim 1, wherein the actuator is moveable between the retracted position and the engaged position by way of an intermediate position, and wherein when the actuator is in the intermediate position, grease is restricted from flowing through the primary grease channel.

7. The grease gun according to claim 1, wherein the first chamber comprises a tertiary grease channel which permits the flow of grease into the first chamber when the actuator is in the retracted or the intermediate position, and a third non-return valve located within the tertiary grease channel which permits the flow of grease through the tertiary grease channel into the first chamber, and wherein, in use, the primary grease channel and the tertiary grease channel are in fluid communication with the container.

8. The grease gun according to claim 1, wherein the actuator is configured to cause reciprocation of the first and second pistons in the same phase when moved between the engaged, intermediate and retracted positions.

9. The grease gun according to claim 1, further comprising:
a mount that is configured to pivotally connect the actuator to the body; and
first and second biasing means that are disposed around the first and second pistons respectively and are each configured to bias the actuator towards the retracted position.

10. The grease gun according to claim 1, wherein the actuator comprises first and second lugs that are configured to engage the first and second pistons respectively, wherein movement of the actuator from the retracted position towards the engaged position causes the first and second lugs to engage the first and second pistons respectively to thereby cause the first and second pistons to move along the first and second axes respectively.

11. The grease gun according to claim 1, wherein the body further comprises:
a first spool channel extending along a third axis,
a spool moveable within the first spool channel between an open position and a closed position; and
a bypass channel in fluid communication with the first chamber and the container by way of the first spool channel;
wherein when the spool is in the open position, it permits the flow of grease out of the first chamber by way of the bypass channel, and when the spool is in the closed position, it restricts the flow of grease out of the first chamber by way of the bypass channel.

12. The grease gun according to claim 11, wherein, in use, when the spool is in the open position, it permits the flow of grease out of the first chamber into the container and when the spool is in the closed position, it restricts the flow of grease out of the first chamber into the container.

13. The grease gun according to claim 11, further comprising:
a pressure channel disposed at a first end of the spool channel, the pressure channel being in fluid communication with the outlet chamber; and
a third biasing means disposed at a second end of the spool channel, the third biasing means being configured to bias the spool towards the closed position,
wherein an increase in pressure in the outlet chamber causes an increase in pressure in the pressure channel and a resulting increase in pressure in at a first end of the first channel to thereby force the spool against the third biasing means, and wherein at a predetermined level of pressure at the first end of the first channel the spool is configured to move towards the open position.

14. The grease gun according to claim 13, wherein the spool comprises:
a first annular ring and a second annular ring that is spaced from the first annular ring; and
a mid-section that is disposed between and boundaried by the first and second annular rings;
the mid-section of the spool having a smaller diameter than a diameter of the spool channel and a diameter of the first and second annular rings;
wherein an area disposed between the mid-section of the spool and a wall of the spool channel forms a communication channel, the communication channel being in fluid communication with the primary bypass channel regardless of whether the spool is in the open position or the closed position.

15. The grease gun according to claim 14, wherein when the spool is in the closed position, the communication channel is not located adjacent to the secondary bypass channel, thereby restricting the flow of grease from the spool channel into the secondary bypass channel.

16. The grease gun according to claim 14, wherein when the spool is in the open position, the communication channel is located adjacent to the secondary bypass channel, thereby permitting the flow of grease into the secondary bypass channel.

17. The grease gun according to claim 14, wherein the spool comprises a cavity that extends through the spool, the cavity being disposed in the mid-section of the spool to allow grease to flow through the mid-section of the spool and fill the communication channel.

18. The grease gun according to claim 11, wherein the bypass channel comprises a primary bypass channel disposed between the first chamber and the spool channel, and a secondary bypass channel disposed between the spool channel and the container, and wherein the primary bypass channel extends along a primary bypass channel axis and the secondary bypass channel extends along a secondary bypass channel axis, the primary bypass channel axis being offset from the secondary bypass channel axis with regard to the spool channel.

19. The grease gun according to claim 18, wherein the spool channel is connected to and disposed between the primary and secondary bypass channels such that when the spool is in the open position grease is able to flow from the primary bypass channel into the secondary bypass channel via the spool channel.

* * * * *